1 : ml $10^{-4}$ m $AgNO_3$
2 : ml $10^{-2}$ m $AgNO_3$ 3,822,198
BREAK RESISTANT MEMBRANE
Friedrich G. K. Bauke, Mainz, Germany, assignor to
Jenaer Glaswerk, Schott & Gen.
Filed Aug. 6, 1971, Ser. No. 169,674
Claims priority, application Germany, Aug. 13, 1970,
P 20 40 200.0
Int. Cl. G01n 27/46
U.S. Cl. 204—195 M                                 7 Claims

ABSTRACT OF THE DISCLOSURE

Membranes for use in electrodes for the measurement of ion concentrations wherein the membranes have at least two layers of different materials, such as a membrane having a layer of impervious polycrystalline AgCl attached to a layer of impervious polycrystalline AgBr.

Disclosure

This invention relates to a break resistant membrane for an electrode for the measurement of ion concentrations and a process for producing such membrane wherein the membrane is constructed as a polycrysalline, glassy, crystalline or glassy bound body of at least two layers whch are impervious to solutions, dispersions, and pastes etc. These layers consist of different materials but nevertheless possess a common electrical current conveying ion, for example $Ag^+$ or $F^-$.

Figure 1:
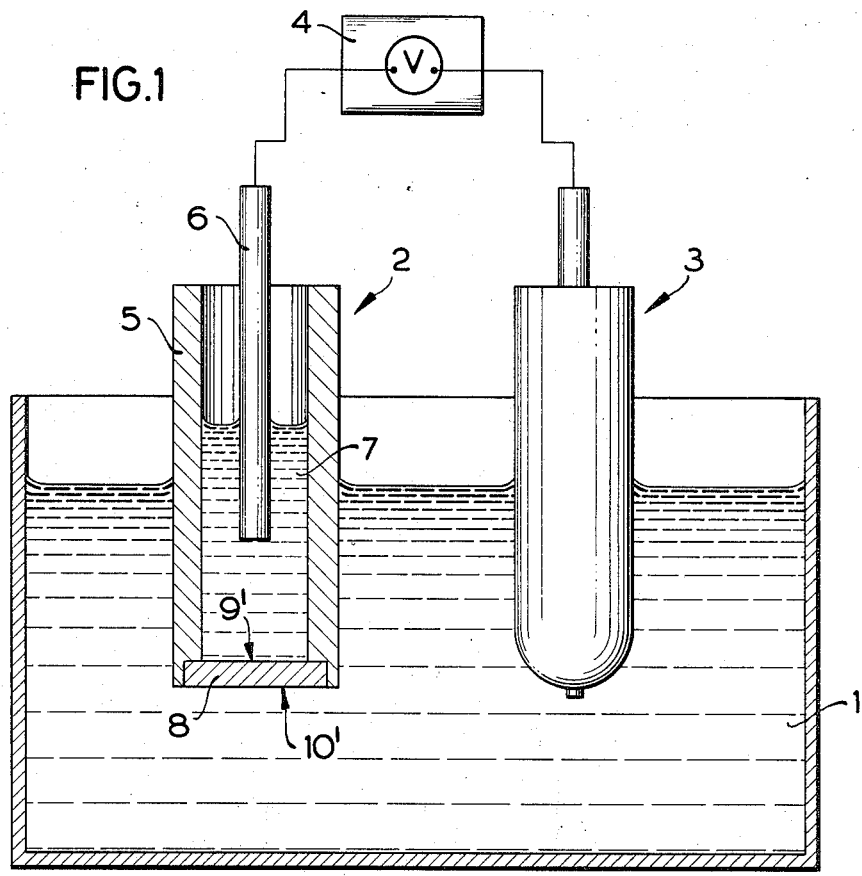
Figure 2:
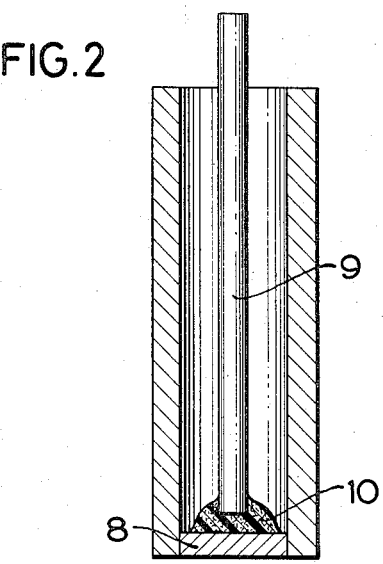

The measurement of ion concentrations is generally carried out as shown in FIG. 1 in connection with the apparatus shown. In order to measure the concentrations of an ion in the solution 1 a measuring electrode 2 and a reference electrode 3 are placed in the solution and conductively connected to one another through a voltmeter 4. The measuring electrode comprises an electrode stem 5, inner reference electrode 6, an inner solution 7, and a membrane 8 permanently or replaceably attached to the electrode stem 5. In FIG. 2 a further known embodiment of the measuring electrode is shown. However, unlike the electrode of FIG. 1, this electrode has no electrolytic solution in the electrode stem but the crystalline membrane 8 is here connected to a copper wire 9 by means of an epoxy resin 10 applied to the membrane and containing electrically conductive metal particles, of silver or copper for example.

It is an object of the present invention to provide an improved membrane for measurement devices of the type shown in FIG. 1.

Membranes of crystalline materials are known. It has already been suggested to produce membranes from single crystals of lanthanide fluorides or from polycrystals of fluorides of lead, bismuth, scandium, yttrium, or lanthanides (U.S. Pat. 3,431,182) or from silver sulfide (Canadian Pat. 763,082). It has further been proposed to employ crystals inserted in plastics by polymerization as membranes.

All of these membranes exhibit great disadvantages. The manufacture of single crystalline membranes is very difficult and relatively expensive since these membranes cannot be manufactured in a single operation. After the crystals have been grown they must still undergo a shaping operation.

Also the manufacture of membranes from ion crystals inserted in plastics by polymerization is relatively difficult. Furthermore, membranes thus manufactured from plastic materials are not readily reproducible and their constancy in the setting of potentials is poor.

Polycrystalline membranes which consist of a single material also exhibit disadvantages which are briefly pointed out below.

1. Polycrystalline membranes have greatly differing mechanical properties which are dependent upon the properties of the materials such as brittleness or resistance to flow at high pressures. For example, AgCl produces mechanically resistant, highly elastic tablets which are similar to horn silver and largely unbreakable. Pressed bodies of other materials, however, are far less break resistant. It has, for example become obvious that pressed bodies of AgI or PbS are very brittle and therefore can be employed as membranes only with the greatest of care.

2. For the measurement of particular ions by means of a membrane which consists of a single material, one must employ an inner solution with an ion that is the same as one of the ions of the salt from which the membrane is made. For such a solution within the electrode, however, an inner reference electrode is again necessary whose potential depends in a prespecified manner upon the concentration of one of the ions in the inner solution. Such inner reference electrodes are very rarely available.

3. In membranes for the measurement of potential the resistivity to electron migration must be as high as possible. On the other hand, the resistance to ion migration should be as low as possible and the conveying number of one of the ions should be 1.

Figure 3A:
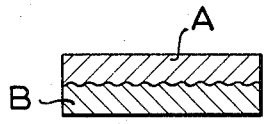
Figure 3B:
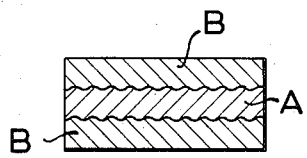
Figure 3C:
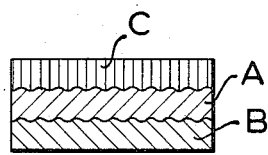

The disadvantages of the prior art membranes consisting of a single material have been overcome according to the present invention in a simple and yet effective manner in that the membranes are no longer made of a single layer but rather as a bound body of two or more layers. As examples are shown a two layer membrane (FIG. 3a) and a three layer membrane (FIG. 3b and FIG. 3c).

I. Double Layer Membrane (FIG. 3a)

If the layer necessary for electrometrical indication is not mechanically resistant and is therefore readily breakable (B) for example AgBr, AgI, PbS, CuS, HgS or $LaF_3$ then the second layer consists of a material having good mechanical properties (A) for example AgCl or $Ag_2S$. This second layer which serves as a current conveying component should have the same ion as the first layer, which is likewise used for electrometrical indication and should advantageously show, on the surface in contact with the inner solution of the electrode, the setting of a contact potential dependent upon one of those ions present in the inner solution of the electrode, one of which ions must, on the other hand, be suitable to form at the inner sensing device, a potential depending upon its concentration.

II. Three layer membrane (FIG. 3b and FIG. 3c)

The membranes according to the present invention can also consist of more than two layers. They may, for example, comprise at least three layers when a supporting layer is necessary for the improvement of mechanical properties and as protection from breaking, (A) provided that this layer which serves as mechanical support does not permit the setting of a contact potential relative to one of the ions present in the inner solution or require an inner solution in which a satisfactorily functioning inner sensing cannot, or cannot readily, be produced.

As shown in FIG. 3b, the electrochemically effective layer (B) may, to be sure, be suitable for the production of a constant potential at the boundary surface of the inner solution of the electrode and also permit a suitable inner sensing without, however, being mechanically resistant itself.

If the mechanically resistant supporting layer A does not fulfill the requirements for the formation of a constant potential relative to the inner solution, or if this layer A requires an inner solution in which an inner sensing cannot be provided, then it is useful to employ a three layer membrane in which the layer in contact with the inner solution again consists of material B, i.e. a $B/A/B$ membrane is used.

If, as shown in FIG. 3c, the electrochemically effective, mechanically non-resistant layer B is of such a type that in its use as a contact layer for the inner solution of the electrode an inner sensing device cannot, or cannot readily, be produced, and if, moreover, the mechanically resistant layer (A) is likewise unsuitable as contact layer for the inner solution, it is advantageous to employ a third layer of a material (C) different than the materials of the two other layers. This layer C does not need to be mechanically resistant but must excel by the production of a constant potential on the boundary of the inner solution and by the possibility of a good inner sensing device of the electrode. Therefore, in this case a $C/A/B$ membrane is preferably used.

The membranes of the present invention therefore consist of two or more layers of different materials. On boundary surface 9' (membrane/inner solution of the electrode) on the one hand and boundary surface 10' (membrane/solution to be measured outside of the electrode) on the other hand prespecified contact potentials are produced, namely, by one or two layers of lesser mechanical resistance or layers which constitute one or both of the surfaces, of the membrane and by a further layer as supporting layer of a mechanically resistant material, on which in the case of a membrane of only two layers, the potential is produced at boundary layer 9' (membrane/inner solution of the electrode). All layers of a membrane should possess a common electrical current conveying ion, as for example $Ag^+$ in a two-layer membrane consisting of AgCl and AgI. The electrochemical properties of membranes comprising two or more layers are not impaired in comparison with membranes consisting of only one layer, as shown by the data in Tables 1 and 2 and by FIG. 4. Following is an explanation of Tables 1 and 2 and FIG. 4.

In the first column of Table 1 chloride ion concentrations of the solutions used for the measuring are given. The second and third columns contain in millivolts the electrode functions $\Delta E/\Delta p$ Cl, i.e. the differences between electromotive forces E measured against one and the same reference electrode if for comparison in the first place (Column 2) a simple membrane of AgCl was used as electrochemically effective membrane of the measuring electrode and in the second place (Column 3) the membrane employed in the measuring electrode consisted of two layers, namely an AgI layer in contact with the inner solution of the electrode and an AgCl layer in contact with the solution to be measured, outside the electrode. The solutions to be measured contained the chloride ion concentrations shown for each case in Column 1. Table 2 contains corresponding comparative data. But in the case, the electrode function $\Delta E/\Delta pI$ i.e. measurements in solutions containing the iodide ion concentrations given in Column 1 are given. The electrode contained in this case, on the one hand, a mechanically non resistant membrane of a single AgI layer (Column 2) which was manufactured and handled with the greatest care, and on the other hand, a double layer membrane of an AgCl layer (as supporting layer adjacent to the inner solution of the electrode) and an AgI layer (as electrochemically effective layer in contact with the outer solution (Column 3)).

The tables show that the electrode functions measured between the various given concentrations of the chloride ions as well as the iodide ions are completely independent of whether membranes of one or two layers are employed for the measurement and that, therefore, the electrochemical properties of the layers employed are in no manner impaired by the use of a double layer membrane.

TABLE 1

| Chloride ion concentration (mol/kg.) | Electrode function $\Delta E/\Delta p$Cl [mv.]; 25° C. | |
|---|---|---|
| | Single membrane: AgCl | Double layer membrane: AgI/AgCl |
| $10^{-1}$ | 59.0 | 58.9 |
| $10^{-2}$ | 58.8 | 58.9 |
| $10^{-3}$ | 58.0 | 57.8 |
| $10^{-4}$ | 36.0 | 36.4 |
| $10^{-5}$ | | |

TABLE 2

| Iodide ion concentration (mol/kg.) | Electrode function $\Delta E/\Delta p$Cl [mv.]; 25° C. | |
|---|---|---|
| | Single membrane: AgI | Double layer membrane: AgCl/AgI |
| $10^{-1}$ | 58.7 | 58.5 |
| $10^{-2}$ | 59.0 | 59.0 |
| $10^{-3}$ | 59.0 | 58.9 |
| $10^{-4}$ | 59.0 | 59.1 |
| $10^{-5}$ | 57.5 | 57.2 |
| $10^{-6}$ | | |

Figure 4:
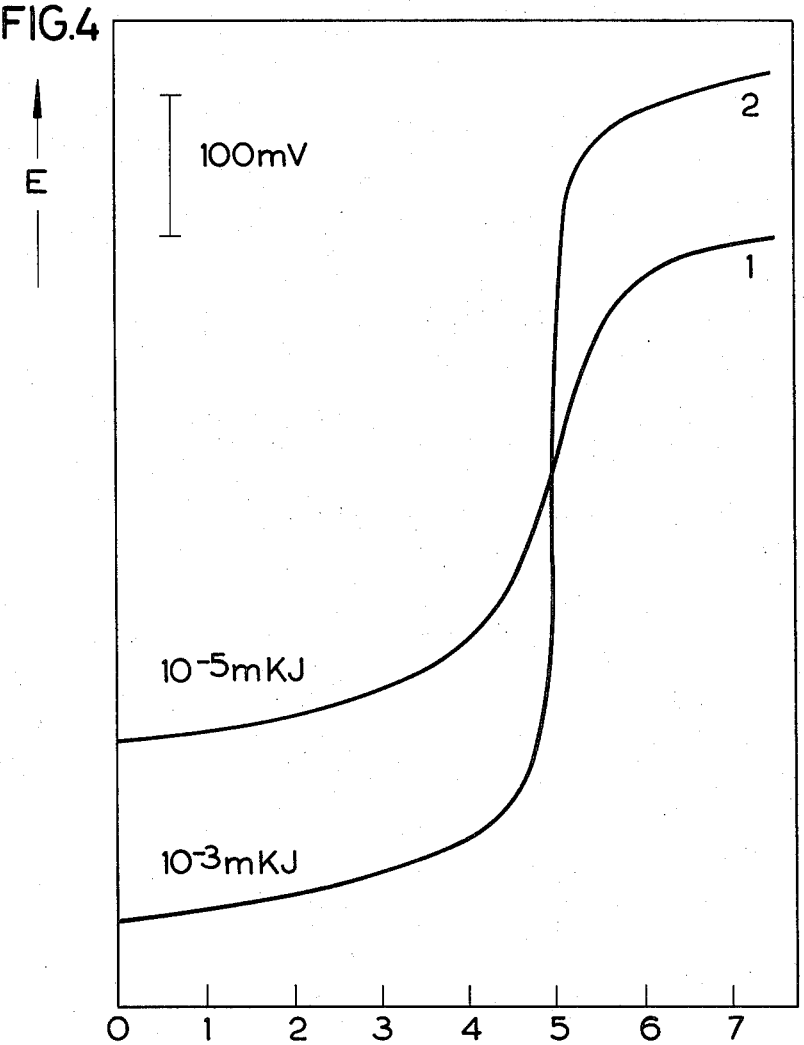

The curves shown in FIG. 4 relate to the potentiometric titration of solutions containing iodide ion concentrations of $10^{-5}$ m. (Curve 1) and $10^{-3}$ m. (Curve 2). These were measured with solutions containing a silver ion concentration ten times greater, i.e. $10^{-4}$ m. (Curve 1) and $10^{-2}$ m. (Curve 2). Each of the curves was produced on the one hand by the use of a single layer membrane of AgI made with great care and inserted into the electrode, and, on the other hand, by the use of a two layer membrane of AgCl (supporting layer in contact with the inner solution of the electrode) and AgI (electrochemically efficient layer in contact with the outer solution). Each of these two curves are completely identical and likewise show clearly no impairment of the electrochemical properties of the layers when used in a two layer membrane.

The membranes are manufactured in a single manufacturing process. After introducing powder material weighed for the formation of the first pressed layer of the desired thickness into the press mold or die, a layer of the most uniform thickness possible is produced from this material by jolting or sweeping over. The surface of this evenly thick layer of the first powdered material is then, for the purpose of a good composite action in the pressing of the various layers, somewhat roughened and covered with a layer of the second, likewise weighed, powder material. From this material a layer of the most uniform thickness possible is also produced and its surface is, if necessary, roughened and, if necessary, covered by the third material and so forth. The various powder material layers formed in this manner in the press die or mold are then placed in a press under vacuum and, possibly at increased temperature, subjected to high pressure and thus pressed to a body which is impervious to solutions, pastes, etc. The values of pressure and temperature employed in this process depend on the properties of the materials, e.g., the flowability of the pressed materials under high pressure.

Membranes manufactured as described above can be employed as measuring electrodes as shown in FIGS. 1 and 2. The attachment of the membrane to the electrode stem can be accomplished in a known manner by glueing or with the aid of an O ring.

Example 1

Following is a brief description of the manufacture of a membrane of the present invention consisting of a 1 mm. thick layer of AgCl and AgI. In a common die press having a piston diameter of 12 mm. 0.63 grams of very finely powdered silver chloride was placed and then smoothed to a uniform layer by means of a common jarring molding machine. After the upper surface of the layer was lightly roughened it was covered with 0.64 grams of finely powdered silver iodide. This second layer was again placed in the jarring molding machine in a layer of uniform thickness. After the press die was brought together and its container evacuated the materials were placed at room temperature, e.g. in a laboratory press under slowly increasing pressure, for approximately 10 minutes at a pressure of approximately 8 to 10 tons per $cm.^2$. After this pressing the pressed article was taken, as usual, from the press die and was usable as membrane of an electrode for the measurement of iodide ion concentrations with employment of an inner solution containing chloride ions and an inner sensing device containing Ag/AgCl.

It is also possible to manufacture such bound bodies by evaporating onto a layer serving as supporting layer, e.g. of AgCl, a second layer, e.g. of AgI, by means of known processes such as high vacuum evaporation.

Example 2

The procedure of Example 1 is repeated except that the silver iodide layer is formed first followed by the silver chloride layer which in turn is followed by a third layer which is silver iodide. The membrane produced corresponds to that shown in FIG. 3b wherein A is silver chloride and B is silver iodide. This membrane functions satisfactorily to measure chloride ion concentration when employed as the membrane 8 in the apparatus of FIG. 1.

Although the invention has been described in considerable detail with reference to certain preferred embodiments thereof, it will be understood that variations and modifications can be effected within the spirit and scope of the invention as described above and as defined in the appended claims.

What is claimed is:

1. A membrane comprising:
   A. an impervious electrometrically indicating layer consisting essentially of a salt of a first and a second ion, wherein either the first or the second ion is Ag or Cl;
   B. An impervious supporting layer of a material different from that of said indicating layer fixedly attached to the electrometrically indicating layer characterized in that the supporting layer consists essentially of AgCl.

2. A membrane comprising:
   A. an impervious electrometrically indicating layer consisting essentially of a salt of a first and a second ion, wherein either the first or the second ion is Ag or S;
   B. An impervious supporting layer of a material different from that of said indicating layer fixedly attached to the electrometrically indicating layer characterized in that the supporting layer consists essentially of $Ag_2S$.

3. In a device for measuring the concentration of iodide ions in a solution of unknown concentration wherein the device comprises a membrane, one surface of which is adapted to contact the solution, the other surface of which is in contact with an electrical conductor, the improvement wherein the membrane comprises:
   A. an impervious electrometrically indicating layer consisting essentially of silver iodide adapted to contact the solution and
   B. an impervious supporting layer fixedly attached to the electrometrically indicating layer, said supporting layer consisting essentially of silver chloride.

4. A membrane comprising:
   A. an impervious electrometrically indicating layer of a salt selected from the group consisting of AgBr, AgI, PbS, CuS, and HgS;
   B. an impervious supporting layer fixedly attached to the electrometrically indicating layer, said supporting layer consisting essentially of a salt selected from the group consisting of AgCl and $Ag_2S$, wherein the salts of both layers have a common ion.

5. The membrane of Claim 4 wherein at least one of the layers consists essentially of a polycrystalline material.

6. The membrane of Claim 4 wherein the supporting layer has a greater mechanical strength than the electrometrically indicating layer.

7. An electrode having a membrane comprising:
   A. an impervious electrometrically indicating layer consisting essentially of silver iodide, and
   B. an impervious supporting layer fixedly attached to the electrometrically indicating layer, said supporting layer consisting essentially of silver chloride.

References Cited

UNITED STATES PATENTS

| | | | |
|---|---|---|---|
| 3,458,422 | 7/1969 | Proctor | 204—195 G |
| 3,657,093 | 4/1972 | Farren | 204—195 M |
| 3,563,874 | 2/1971 | Ross et al. | 204—1 T |

FOREIGN PATENTS

| | | | |
|---|---|---|---|
| 495,303 | 11/1938 | Great Britain | 204—195 G |

OTHER REFERENCES

"J. of the Electrochemical Soc.," June 1957, vol. 104, No. 6, pp. 379–387.

TA-HSUNG TUNG, Primary Examiner

U.S. Cl. X.R.

204—295